US010062066B2

(12) United States Patent
Cancro et al.

(10) Patent No.: US 10,062,066 B2
(45) Date of Patent: Aug. 28, 2018

(54) SYSTEMS AND METHODS FOR RETRIEVING ITEMS FOR A CUSTOMER AT CHECKOUT

(71) Applicant: Wal-Mart Stores, Inc., Bentonville, AR (US)

(72) Inventors: Richard Neil Cancro, Portland, OR (US); Joel Bennett Acker, Jr., Brush Prairie, WA (US); Douglas James Pedley, Portland, OR (US)

(73) Assignee: WALMART APOLLO, LLC, Bentonville, AR (US)

( * ) Notice: Subject to any disclaimer, the term of this patent is extended or adjusted under 35 U.S.C. 154(b) by 60 days.

(21) Appl. No.: 13/754,790

(22) Filed: Jan. 30, 2013

(65) Prior Publication Data

US 2014/0214572 A1  Jul. 31, 2014

(51) Int. Cl.

| G06G 1/12 | (2006.01) |
|---|---|
| G06Q 20/20 | (2012.01) |
| G06Q 30/02 | (2012.01) |
| G06Q 10/08 | (2012.01) |
| G06Q 40/00 | (2012.01) |
| G06Q 10/06 | (2012.01) |
| G06K 7/14 | (2006.01) |
| G06K 19/077 | (2006.01) |
| G06K 19/07 | (2006.01) |

(Continued)

(52) U.S. Cl.
CPC ......... *G06Q 20/208* (2013.01); *G06K 7/1413* (2013.01); *G06K 19/0723* (2013.01); *G06K 19/07749* (2013.01); *G06K 19/07773* (2013.01); *G06Q 10/06315* (2013.01); *G06Q 10/087* (2013.01); *G06Q 20/3274* (2013.01); *G06Q 30/0201* (2013.01); *G06Q 30/0267* (2013.01); *G06Q 40/12* (2013.12); *G07G 1/0054* (2013.01)

(58) Field of Classification Search
CPC ...... G06Q 20/202; G06Q 20/20; G06Q 20/40; G06Q 20/322; G06Q 30/06
USPC .......................................................... 705/21
See application file for complete search history.

(56) References Cited

U.S. PATENT DOCUMENTS

| 5,918,211 A | 6/1999 | Sloane |
|---|---|---|
| 6,601,764 B1 | 8/2003 | Goodwin, III |
| 6,641,037 B2 | 11/2003 | Williams |

(Continued)

OTHER PUBLICATIONS

Ferreira, Diogo Manuel Ribeiro. Workflow management systems supporting the engineering of business networks. Universidade do Porto (Portugal), ProQuest Dissertations Publishing, 2003.*

*Primary Examiner* — Florian M Zeender
*Assistant Examiner* — Fawaad Haider
(74) *Attorney, Agent, or Firm* — Bryan Cave Leighton Paisner LLP

(57) ABSTRACT

Systems and methods are disclosed herein for processing transactions at an in-store POS where some of the items of the transaction have not been retrieved, i.e. the customer neglected to add a needed item to a shopping cart. A customer selects a product on a user computing device and invokes display of an optical code corresponding to an unretrieved product. A point of sale (POS) device then scans the optical code to add the product to the transaction. The POS device or user computing device may transmit an alert to a representative computing device instructing a store representative to retrieve the product and deliver it to the POS or some other location.

14 Claims, 7 Drawing Sheets

(51) Int. Cl.
*G07G 1/00* (2006.01)
*G06Q 20/32* (2012.01)

(56) References Cited

U.S. PATENT DOCUMENTS

| | | |
|---|---|---|
| 6,837,436 B2 | 1/2005 | Swartz |
| 7,063,263 B2* | 6/2006 | Swartz et al. ........... 235/472.02 |
| 7,118,036 B1 | 10/2006 | Couch |
| 7,737,858 B2 | 6/2010 | Matityaho |
| RE41,717 E | 9/2010 | Dejaeger |
| 8,219,558 B1 | 7/2012 | Trandal |
| 2003/0120563 A1 | 6/2003 | Meyer |
| 2003/0216969 A1 | 11/2003 | Bauer |
| 2007/0114276 A1* | 5/2007 | Namiki ................ G07G 1/0045 235/383 |
| 2008/0027796 A1* | 1/2008 | Chaves ................. G06Q 30/02 705/14.51 |
| 2013/0297451 A1* | 11/2013 | Lishak et al. ............. 705/26.35 |

* cited by examiner

SYSTEMS AND METHODS FOR RETRIEVING ITEMS FOR A CUSTOMER AT CHECKOUT

FIELD OF THE INVENTION

This invention relates to systems and methods for conducting a transaction at an in-store point of sale (POS).

BACKGROUND OF THE INVENTION

A busy shopper may have a large number of items to pick up. Upon arrival at a point of sale many customers have had the unpleasant experience of realizing that a needed item is not in the customer's cart. Remedying this situation is inconvenient for all. A cashier may simply wait while the customer goes to retrieve the item. This increases the time the customer requires to checkout. Other customers in line may become particularly frustrated if made to wait. The cashier might simply conclude the transaction for the retrieved items, requiring the customer to retrieve the item and then wait in line again to purchase the unretrieved item. This creates additional inconvenience inasmuch as the purchase of previously purchased items may need to be verified by the cashier when processing payment for the previously unretrieved item.

The systems and methods described herein provide an improved approach for processing in-store transactions where one or more items have not been retrieved by the customer.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
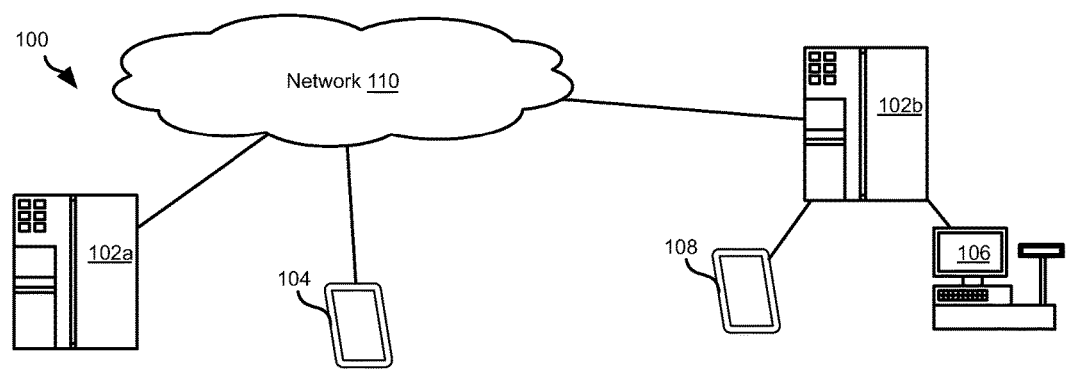
FIG. 1 is a schematic block diagram of a system suitable for performing methods in accordance with embodiments of the invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The embodiments disclosed herein may advantageously be implemented using a Java language and runtime environment or a Node.js implementation. In particular, functionality implemented on a server may be implemented using one or both of these methods.

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include a server system 102a that may be embodied as one or more server computers each including one or more processors that are in data communication with one another. The server system 102a may be in data communication with one or more customer computers 104 and one or more point of sale (POS) devices 106. In the methods disclosed herein, a customer computer 104 is advantageously a mobile device such as a mobile phone or tablet computer. As known in the art, many mobile phones and tablet computers also include cameras that can be used to scan optical codes such as barcodes, two-dimensional bar codes (e.g. quick response (QR) codes), or textual information. In some embodiments, some or all of the methods disclosed herein may be performed using a desktop computer or any other computing device as the customer computer 104. For purposes of this disclosure, discussion of communication with a user or entity or activity performed by the user or entity may be interpreted as communication with a computer 104 associated with the user or entity or activity taking place on a computer associated with the user or entity. A POS 106 may be located within a store and may be part of a POS network. In some embodiments, a POS 106 may be operable to process online transactions. In some embodiments, separate computers of the server system 102a may handle communication with the customer computers 104 and POS 106.

In some embodiments, a server system 102a is a global server system 102a owned or controlled by a merchant operating multiple stores, such as over a large geographic area. Individual stores or groups of stores may have their own local server systems 102b that store or access data that is unique to a particular store or to stores in a particular region. In such embodiments, the local server system 102b may likewise be in data communication with the POS 106 associated with the server system 102b, such as the POS 106 of a store or stores in a region. In some embodiments, the server system 102b may be in data communication with representative computing device 108 that is carried or otherwise accessible by a store representative.

The server system 102b may communicate with the POS 106 and representative computing device 108 by means of a local network, such as a local wireless or wired network. The server system 102a may likewise communicate with the server 102b such as by means of a network 110. The network 110 may be embodied as a peer-to-peer wireless connection between devices, a connection through a local area network (LAN), WiFi network, the Internet, or any other communication medium or system. The user computing device 104 may likewise communicate with the server system 102a or 102b by means of the network 110. In some embodiments, the user computing device 104 communicates with one or both of the POS 106 and server 102b by way of the server system 102a in order to implement the methods disclosed herein. In other embodiments, the user computing device 104 communicates directly with these devices by means of a network such as a network local to a store or the network 110.

Figure 2:
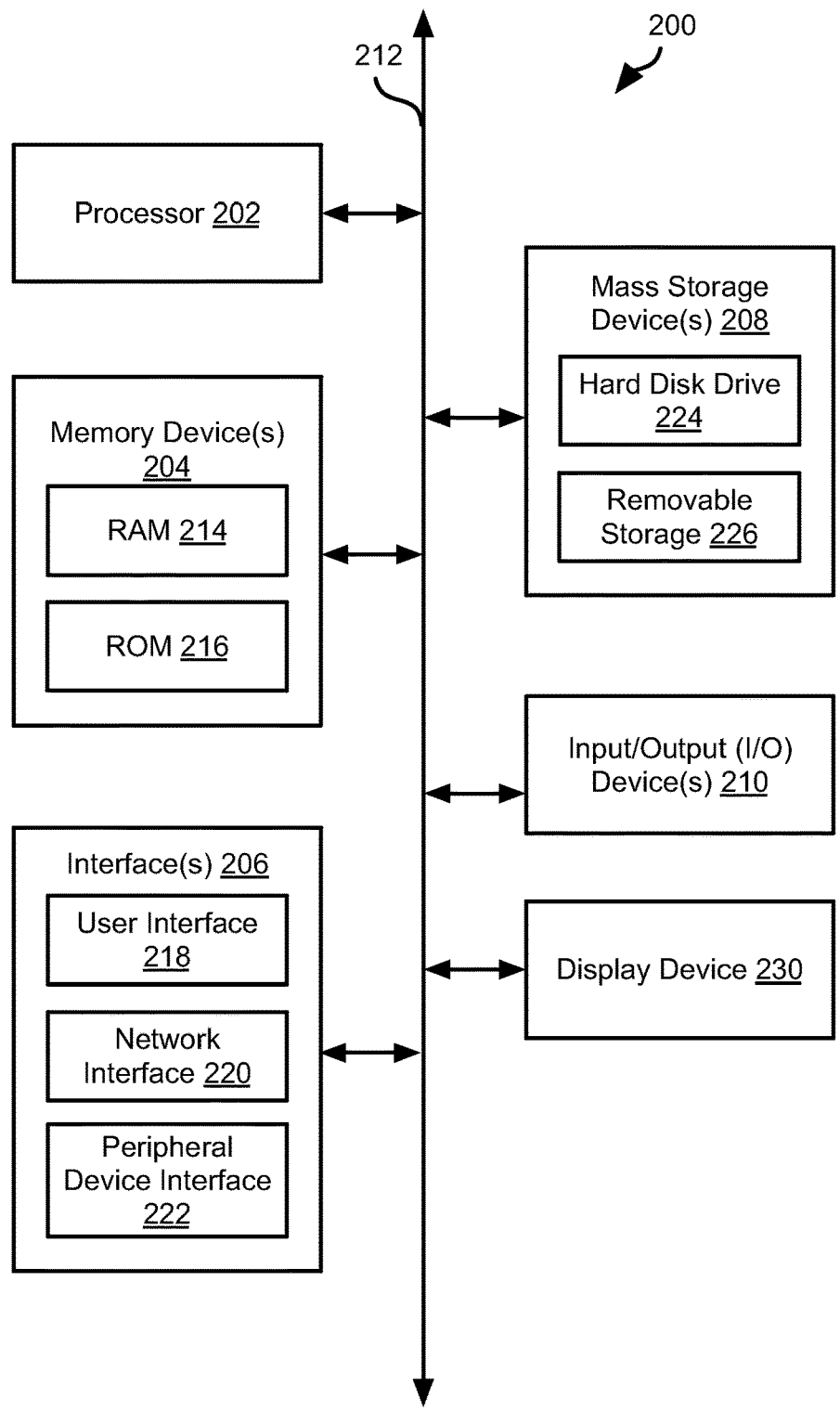
FIG. 2 is a block diagram of a computing device suitable for implementing embodiments of the invention.

FIG. 2 is a block diagram illustrating an example computing device 200. Computing device 200 may be used to perform various procedures, such as those discussed herein. A server system 102a, 102b, customer device 104, POS 106, and representative computing device 108 may include some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
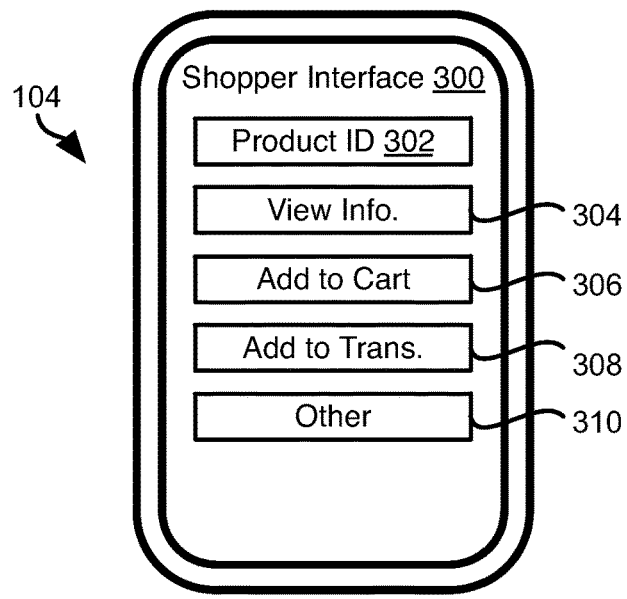
FIG. 3 is a schematic diagram of an interface on a user computing device suitable for use in accordance with embodiments of the invention.

FIG. 3 illustrates an interface 300 that may be presented on a user computing device 104, such as a user computing device 104 embodied as a mobile phone or tablet computer. The illustrated interface 300 may be presented for a particular product selected by the user. The product may be selected by navigating a product catalog, typing the product into a search field and selecting the product from search results, or some other method. As described in greater detail below, the interface 300 for a product may be displayed in response to user selection of the product from a list of suggested products.

The interface 300 may include various interface elements for invoking various actions with respect to a product. For example, the interface 300 may include a product identifier 302, which may include a name of the product, image of the product, or other information identifying the product. The interface 300 may further include an interface element 304 effective to invoke display of additional information for a product, such as consumer reviews, expert reviews, how-to, or other relevant information. The interface 300 may include an interface element 306 effective to invoke addition of the item to an electronic shopping cart.

Of particular use for the methods disclosed herein, the interface 300 may include an interface element 308 effective to invoke addition of a product to an electronic shopping cart as an unretrieved item. The interface element 308 may also invoke other functionality described herein for adding an unretrieved product to a transaction. For example, the interface element 308 may invoke display of an optical code (e.g. uniform product code (UPC) car code) for the unretrieved product, such that this optical code may be scanned by the POS 106 to add the product to a transaction. The interface 300 may include one or more other user interface elements 310 for invoking other actions with respect to a product.

Figure 4:
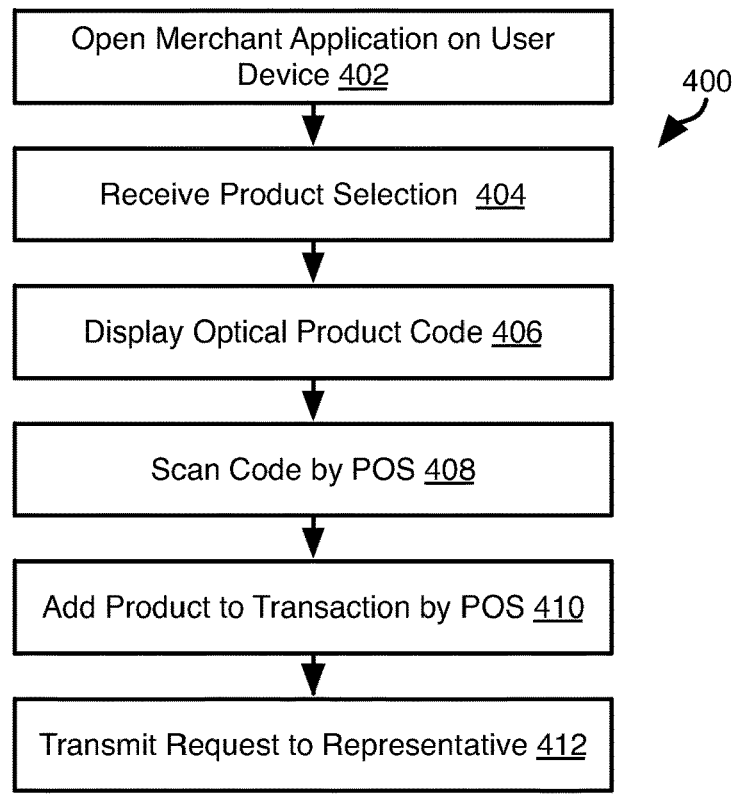
FIG. 4 is a process flow diagram for adding an unretrieved product to a transaction in accordance with an embodiment of the invention.

FIG. 4 illustrates a method 400 that may be used to process a transaction including unretrieved items. The method 400 may include opening 402 a merchant application on the user computing device 402 and receiving 404, by the user computing device 104, a selection of a product through the interface. The merchant application may be implemented as a web page, such has a web interface to a product catalog. The merchant application may also be a dedicated application executing on the user computing device 104 and some of the functionality thereof may be implemented on a server system 102a in data communication with the user computing device 104a. The product selection may also be received 404 by the user typing a product name in the interface or speaking a name of the product into a microphone of the user computing device 104. In response to receipt of the selection, the user computing device 104a displays 406 an optical code corresponding to the selected product. The optical code for the selected product may be retrieved by the user computing device from data stored locally thereon or may be requested from a server system 102a or 102b. In some embodiments, the user computing device 104a may perform the step of encoding a product identifier into an optical code according to an established protocol.

The code displayed on the user computing device 104 may then be scanned 408 by the POS 106 in the usual manner, such as using a laser barcode scanner, camera, or some other means. The POS 106 may then add the product to a transaction in the same manner as other products that have been retrieved by the customer and scanned by the scanner of the POS. In some embodiments, the POS may transmit 412 an alert to a representative computing device 108. The alert may indicate some or all of the product to be retrieved, a likely location of the product, an identifier of the POS issuing the request, and an indicator of the location of the POS issuing the request. In some embodiments, the alert may be issued by the user computing device 104, such as by the merchant application in response to receipt 404 of the product selection. Where the request is user generated, the request may indicate a GPS location of the user computing device 104 as derived from an internal GPS receiver of the device 104.

The products added to the POS transaction either by scanning a code affixed to the product or scanning a code displayed on the user computing device may then be purchased in the usual manner including receiving tender of payment and issuing a receipt. In some embodiments, the POS 106 may invoke printing of a receipt such that a listing of an unretrieved product is marked or otherwise highlighted to indicate that the product was not retrieved at the time of purchase. In some embodiments, the POS 106 may invoke printing of a ticket for use in proving purchase of the product when later retrieved by the customer or received from a retrieving store representative.

Figure 5:
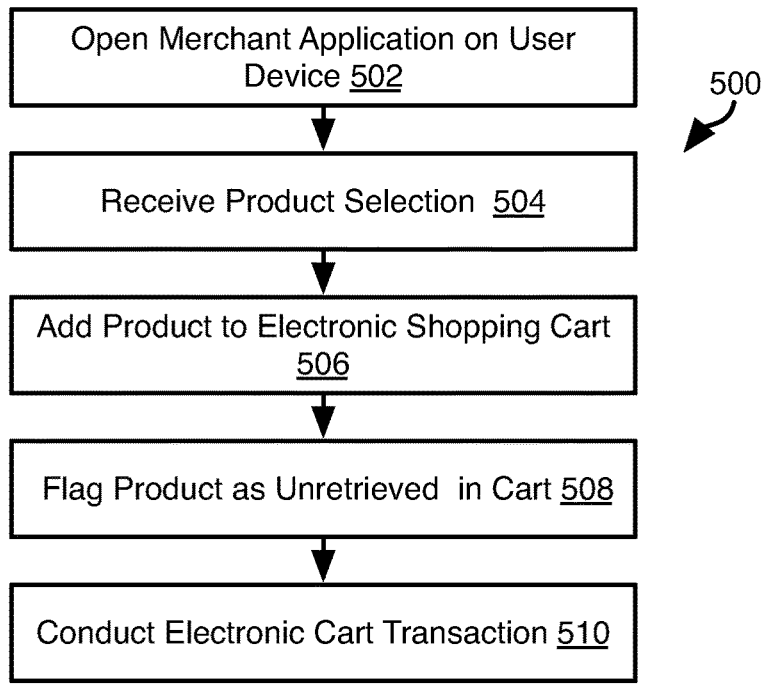
FIG. 5 is a process flow diagram of a method for adding an unretrieved product to an electronic shopping cart in accordance with an embodiment of the invention.

FIG. 5 illustrates a method 500 for conducting a transaction using an electronic shopping cart where unretrieved items are included in the shopping cart. The method 500 may be executed by a user computing device 104 or on a server system 102*a* with an interface provided on the user computing device 104. The method 500 may include opening a merchant application 502 and receiving 504 a product selection in the merchant application. Steps 502 and 504 may include some or all of the attributes of steps 402 and 404 of the method 400. The selected product is then added 506 to an electronic shopping cart, either by making an entry for the product in a data structure stored locally on the user computing device 104*a* or transmitting the selection to the server system 102*a* for addition to an electronic shopping cart accessible thereto.

The entry in the electronic shopping cart may be flagged 508 as unretrieved. The method 500 contemplates that the addition of unretrieved products to the electronic cart will occur while a user is in line at a POS 106 or otherwise in the process of checking out. However, the addition of unretrieved products may occur at any time, for example where a product is not currently available on shelves or is otherwise not made available for self-retrieval by customers.

A transaction for the purchase of the items in the shopping cart may then be conducted 510. This may include executing one or both of the method illustrated in FIG. 7B and the method illustrated in FIG. 8.

Figure 6:
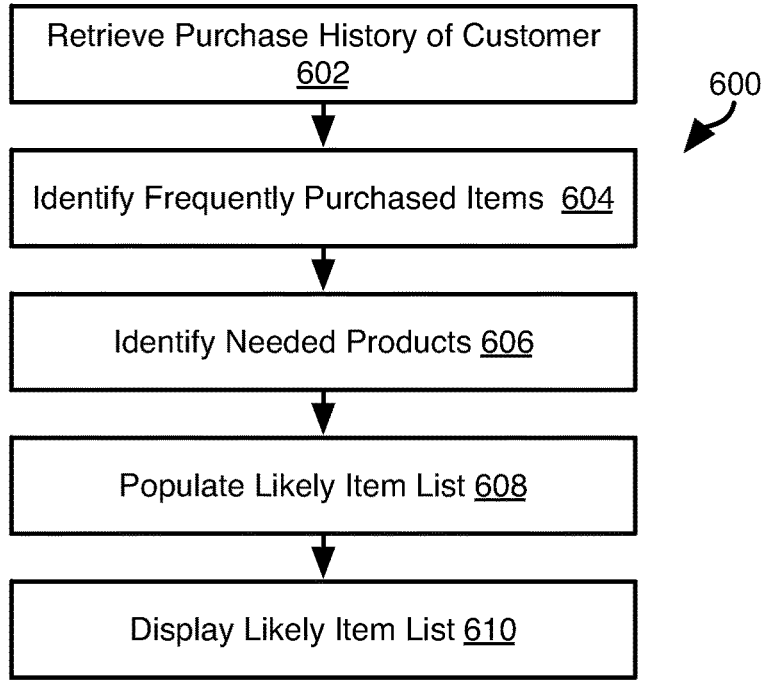
FIG. 6 is a process flow diagram of a method for generating a suggested product list for assisting in selecting an unretrieved product in accordance with an embodiment of the invention.

Referring to FIG. 6 in some embodiments, to help a customer find an unretrieved item to add to a transaction, a list of likely items may be compiled for the customer either in advance of when they are needed or on demand as the user seeks to add an unretrieved item to an electronic shopping cart or transaction according to the methods disclosed herein. The method 600 may be executed on the user computing device 104 or on a server system 102*a* with an interface provide on the user computing device.

For example, the method 600 may be executed to identify a list of likely items. The method 600 may include retrieving 602 a purchase history for a customer. The purchase history of a customer may be stored by the server system 102*a* or otherwise accessible by the server 102*a*. The purchase history may be compiled by a customer self-reporting transactions to the server 102*a* and associating the transactions with an account of the customer. The purchase history may additionally be compiled by the customer self-reporting an customer identifier at the time of conducting a transaction at an in-store POS 106. The POS 106 may then report the transaction and customer identifier to the server system 102*a*, which then stores details of the transaction in an account of the customer. The details of the transaction stored by the server system 102*a* may include the items purchased, a quantity of items purchased, a date of the transaction, coupons used, or any other detail of the transaction.

The purchase history may be analyzed 604 to identify frequently purchased items. For example, the top N items purchased the most frequently may be identified. These N items may be used to populate a list of likely items without further processing. In some embodiments, the method 600 may include further filtering frequently purchased items to identify 606 products that are likely to be needed. For example, for products with an expiration date, the elapsed time since the last purchase of the item may be compared to the expiry period for that item. If the elapsed time exceeds the expiry period or is within some threshold amount of the expiry period, the method 600 may include identifying 606 this item as a needed item inasmuch as the previously purchased item is expired or will soon expire.

In some embodiments, a purchase period for a frequently purchased item may be determined, such as by identifying an average elapsed time between purchases of the item by the customer. If the time expired since the last purchase of the item exceeds this purchase period or is within a threshold amount of the purchase period, then this item may be identified 606 as a needed product.

A list of needed items may then be populated 608 with either only items identified 606 as needed or both items identified as needed and items identified as frequently purchased but not necessarily needed. In some embodiments, two lists may be populated 608, one with needed items and the other with frequently purchased items regardless of need. The list or lists of items may then be displayed 610, or transmitted for display, on the user computing device 104. The user computing device 104 may then receive a selection of an item from the displayed one or more lists in accordance with the methods 400 or 500 or in some other context.

Figure 7A:
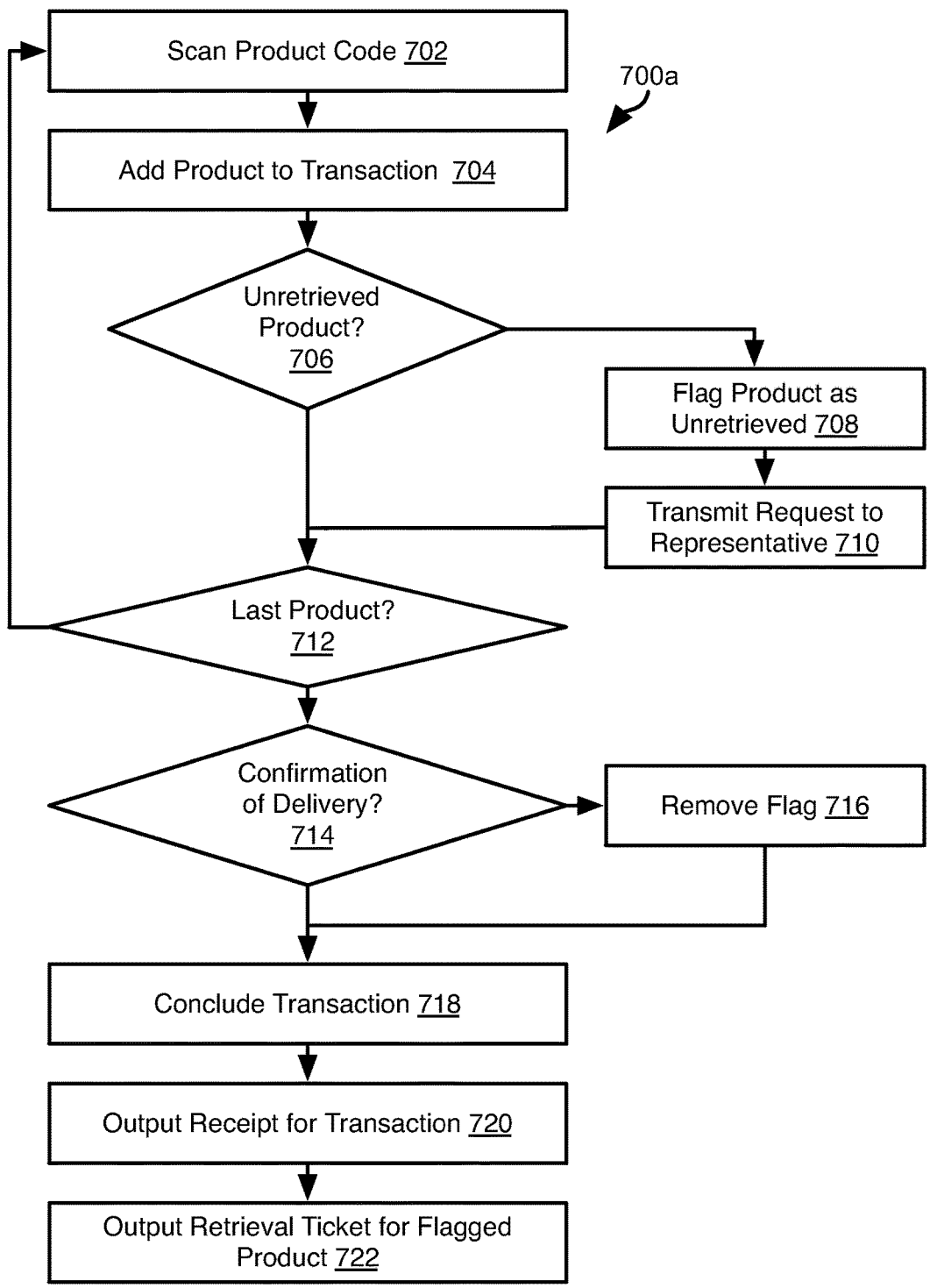
FIG. 7A is a process flow diagram of a method for processing a transaction including unretrieved items at a point of sale (POS) in accordance with an embodiment of the invention.

FIG. 7A illustrates an example method 700*a* that may be executed by a POS 106 in order to process a transaction including both retrieved items and unretrieved items, such as unretrieved items selected according to the methods described hereinabove. The method 700*a* may include scanning 702 a product code, such as by scanning an optical code affixed to a product or product packaging or scanning an optical code displayed on a user computing device according to the methods described hereinabove. An entry for the product corresponding to the scanned 702 code may then be added 704 to a transaction being conducted on the POS 106.

If the scanned product is found 706 to be an unretrieved product, then the product may be flagged 708 as unretrieved, such as in a data structure or record of the in-progress transaction. An alert may further be transmitted 710 to a representative computing device 108. The alert may include such information as the product, a quantity of the product, an identifier of the POS 106 performing the method 700*a*, a location of the POS 106, a location of the customer, or any other information to facilitate delivery of the unretrieved product to the customer. The determination of whether a product is unretrieved may be based on an input to the POS 106 from a cashier indicating that the product is unretrieved. Alternatively, the optical code displayed on the user computing device 104 may encode this information or a second optical code may be displayed adjacent to a first optical code identifying the product, wherein the second optical code indicates that the product is unretrieved. Alternatively, the second optical code may be displayed and scanned before or after the first optical code identifying the unretrieved product is displayed and scanned.

The steps 702-710 may be repeated until all products for a transaction are found 712 to have been scanned, the method 700*a* may include evaluating 714 whether confirmation of delivery of an unretrieved item has been received. In some circumstances, a store representative may be able to deliver a product to the POS 106 prior to conclusion of the transaction. Confirmation may be indicated to the POS 106 by the cashier providing an input indicating that the product has been received, scanning a code affixed to the previously unretrieved product and indicating that the just-scanned product corresponds to an unretrieved product, receiving a message from the representative computing device 108 indicating that the product has been received, or some other means. If confirmation of delivery 714 is found to have been received prior to ending of the transaction, a flag associated with the previously unretrieved product may be removed 716.

The transaction may then be concluded 718 in the usual manner for an in-store transaction, including receiving tender of payment, processing an electronic payment, or other processing steps for concluding a transaction at a POS 106. The method 700a may further include invoking 720 by the POS 106 printing or output by some other means of a receipt for the transaction. The receipt may list all items including unretrieved items and may mark, highlight, or otherwise indicate that an item is unretrieved.

In some embodiments, the method 700a may further include invoking 722 printing or output by some other means, such as an electronic message, a ticket for a product flagged as unretrieved as of conclusion 718 of the transaction. The ticket may identify the product and may be used by the customer to retrieve the unretrieved product. For example, in one method of use a store representative may deliver an unretrieved product to a designated area in a store. The customer may then present the ticket output at step 722 at this location in exchange for the product. Where the ticket is an electronic data structure, a store representative may invoke deletion or invalidation of the ticket upon delivery of the product or products associated with the ticket to the customer. The retrieval location may preferably be placed at a point between a POS 106 and an exit of the store. In other embodiments, a user identifier may be associated with the unretrieved product such that a user need only present photo identification in order to retrieve the product.

In other methods of use, the customer may retrieve the previously-unretrieved product and the ticket may be presented to security personnel in order to verify that the previously-unretrieved product was paid for. The ticket may be surrendered to a store representative at the time of verification to prevent repeated retrieval of the same item. In other embodiments, the security personnel may simply mark a receipt to indicate that the product has been retrieved.

Figure 7B:
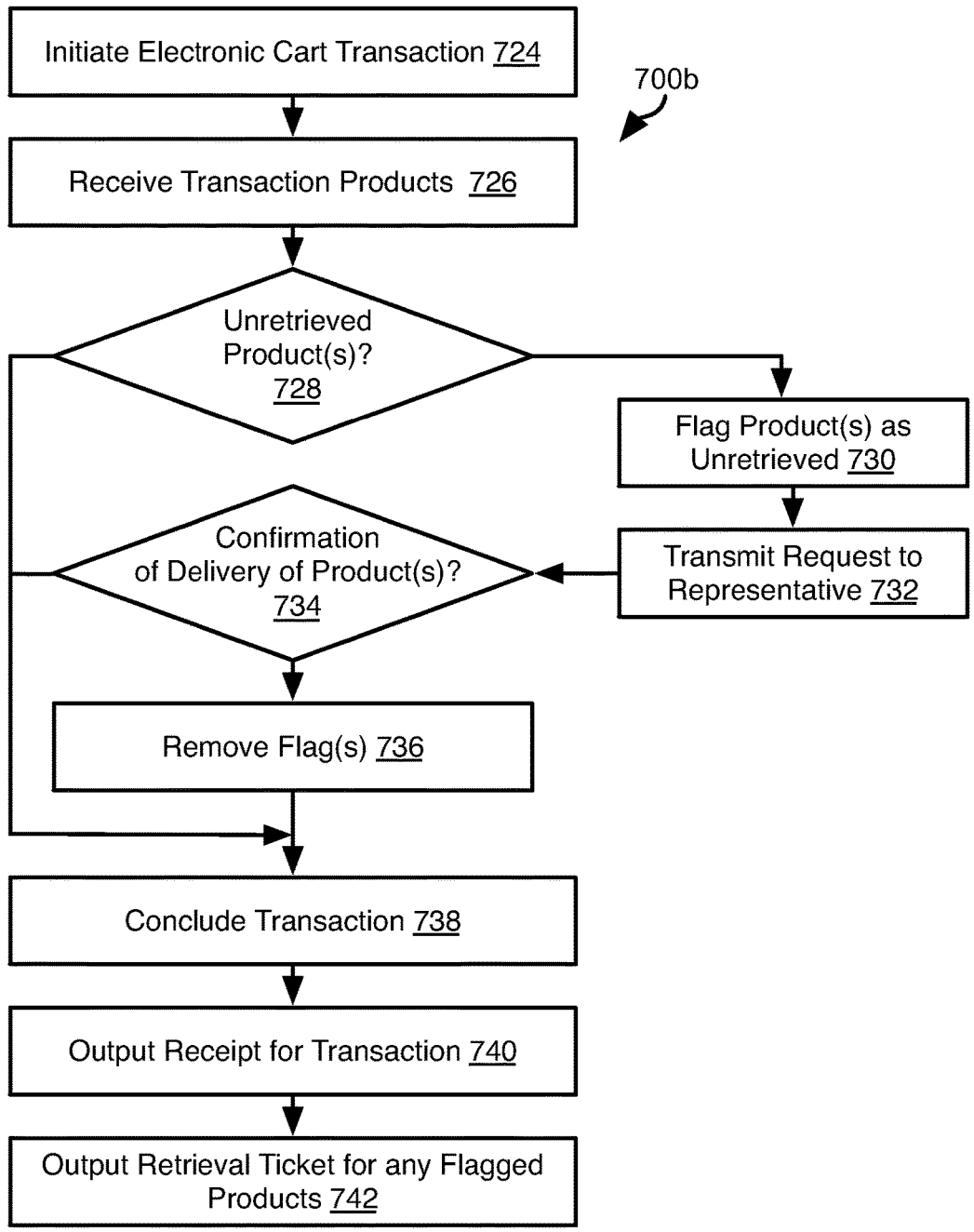
FIG. 7B is a process flow diagram of a method for processing a transaction including unretrieved items using an electronic shopping cart in accordance with an embodiment of the invention.

FIG. 7B illustrates a method 700b that may be executed by a POS 106 to process transactions involving both an electronic shopping cart and unretrieved items. The method 700b may include initiating 724 an electronic shopping cart at a POS 106. This may include performing the method 800 illustrated in FIG. 8. In particular, initiating 724 may include coupling a user computing device 104 and a POS 106 as described below with respect to FIG. 8. The products in an electronic shopping cart may then be received 726 as transmitted from the user computing device 104, which may be by way of a server computer system 102a, 102b. The electronic shopping cart as transmitted to the POS 106 may include indications that certain products are unretrieved.

Accordingly, the method 700b may include evaluating 728 whether the electronic shopping includes one or more unretrieved products. If so, then these one or more products may be flagged 730 as unretrieved, such as in a data structure or record of the in-progress transaction. An alert may further be transmitted 732 to a representative computing device 108, either by the POS 106 or a user computing device 104. The alert may include such information as the product, a quantity of the product, an identifier of the POS 106 performing the method 700a, a location of the POS 106, a location of the customer, or any other information to facilitate delivery of the unretrieved product to the customer.

If at some point prior to conclusion of a transaction a previously-unretrieved product is found 734 to have been received, the flag associated with that product may be removed 736. For example, in some circumstances, a store representative may be able to deliver a product to the POS 106 prior to conclusion of the transaction. Confirmation may be indicated to the POS 106 by the cashier providing an input indicating that the product has been received, scanning a code affixed to the previously unretrieved product and indicating that the just-scanned product corresponds to an unretrieved product, receiving a message from the representative computing device 108 indicating that the product has been delivered to the customer, or some other means.

The transaction for the items in the shopping cart may then be concluded 738, such as by receiving tender of payment for an amount owed and/or processing an electronic payment for the transaction. Concluding a transaction may be in accordance with the method 800 of FIG. 8 for processing transactions using electronic shopping carts.

The method 700b may further include invoking 740 by the POS 106 printing or output by some other means of a receipt for the transaction. As described in greater detail with respect to the method 800 of FIG. 8, an electronic receipt may be pushed to a user computing device or associated with an account of the customer. The receipt may list all items including unretrieved items and may mark, highlight, or otherwise indicate that an item is unretrieved. In some embodiments, In some embodiments, the method 700b may further include invoking 742 printing or output by some other means, such as an electronic message, a ticket for a product flagged as unretrieved as of conclusion 718 of the transaction. The ticket may identify the product and may be used by the customer to retrieve the unretrieved product. For example, in one method of use a store representative may deliver an unretrieved product to a designated area in a store. The customer may then present the ticket output at step 742 at this location in exchange for the product. The retrieval location may preferably be placed at a point between a POS 106 and an exit of the store. Where the ticket is an electronic data structure, a store representative may invoke deletion or invalidation of the ticket upon delivery of the product or products associated with the ticket to the customer. In other embodiments, a user identifier may be associated with the unretrieved product such that a user need only present photo identification in order to retrieve the product.

In other methods of use, the customer may retrieve the previously-unretrieved product and the ticket may be presented to security personnel in order to verify that the previously-unretrieved product was paid for. The ticket may be surrendered to a store representative at the time of verification to prevent repeated retrieval of the same item. In other embodiments, the security personnel may simply mark a receipt to indicate that the product has been retrieved.

Figure 8:
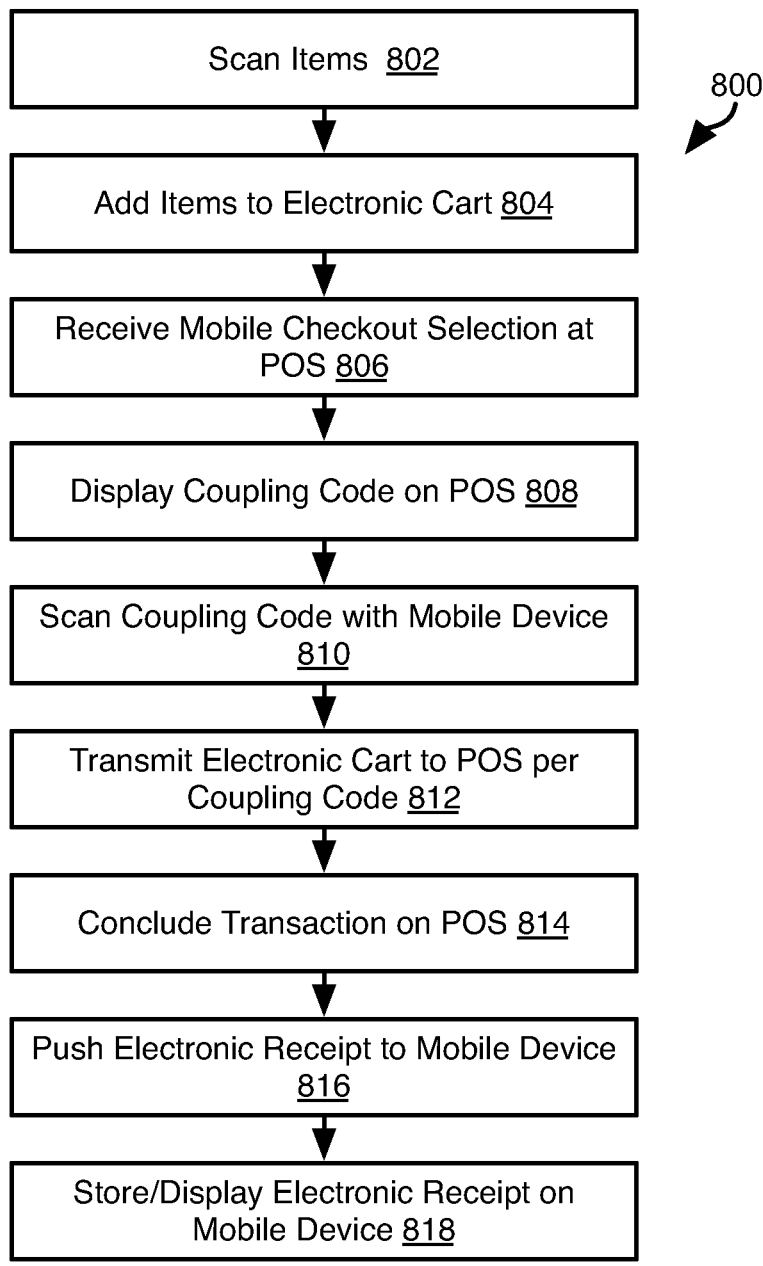
FIG. 8 is a process flow diagram of a method for processing a transaction at an in-store POS using an electronic shopping cart in accordance with an embodiment of the invention.

FIG. 8 illustrates an example method 800 for conducting an in-store transaction using an electronic shopping cart assembled by the user invoking addition of products thereto. Products may be selected for addition to the electronic shopping cart by one or both of scanning an optical code affixed to instances of the product and invoking addition of the product to the electronic shopping cart, such as using the interface 300 of FIG. 3. In conventional ecommerce transactions, an electronic shopping cart is assembled online, electronic payment is processed, and then shipping of the purchased products is authorized. In the illustrated method 800, an electronic shopping cart is populated by scanning items in a store with a user computing device 104a as described above.

In the illustrated method 800, items are scanned 802 and added 804 to an electronic shopping cart, such as according to the methods described hereinabove. At a POS 106, a request may be received 806 to use mobile self checkout (MSCO). This may be communicated verbally to a cashier who then inputs or otherwise specifies the MSCO option to the POS 106. In response to receipt of this instruction, the POS 106, generates and displays a code that is used to couple a particular user computing device to that POS 106. The displayed code may be a one-off code that is generated for each transaction or otherwise used for only one transaction.

The user computing 104 scans 810 the displayed coupling code. The user computing device then transmits 812 the contents of the electronic cart to the POS 106 using the coupling code. This coupling code may be an address that can be used to transmit the contents of the electronic shopping cart directly to the POS 106. Alternatively, the contents of the cart with the coupling code may be transmitted with the coupling code to the global server system 102a. The global server system 102a may then interpret the coupling code to identify the POS 106 that generated the coupling code and transmit the contents of the electronic shopping cart to this POS 106.

The contents of the electronic shopping cart received by the POS 106 may then be used to conclude 814 the transaction on the POS 106. The items received by the POS 106 may, for example, may treated in the same manner as items input to the POS 106 by scanning bar codes in the conventional manner. Likewise, concluding 814 the transaction may include receiving tender of cash, check, or electronic payment, as for the typical in-store transaction.

In some embodiments, the POS 106 may simply invoke printing of a paper receipt after concluding 814 the transaction. In some embodiments, the POS 106 may additionally or alternatively push 816 an electronic receipt to the user computing device 104. For example, the contents of the electronic shopping cart received by the POS 106a may be accompanied by a user identifier. This user identifier may then be used by the POS 106 to route an electronic receipt to the user computing device 104 and/or associated the electronic receipt with a user account associated with the user identifier. A user computing device 104 upon receiving the pushed electronic receipt, the user computing device may one or both of store 818 the electronic receipt and display the receipt on the user computing device 104.

The method 800 is just one example of a use for data obtained according to methods described herein. In particular, the information obtained by scanning product information displayed in an optical code displayed by the in-store scanner 108 may be provided to an application that interacts with data or services provided by the global server system 102a in the same manner as product information retrieved from the server system 102a.

The invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for processing a transaction with said method utilizing a user computing device coupled to and in data communication with a point-of-sale (POS) device in a store and the POS device coupled to and in data communication with a computing device of a store representative, the POS device having a scanner and the user computing device having a user interface, a memory for storing one or more application programs including computer-readable instructions, and a processor for executing the computer-readable instructions, and said method comprising steps of:

provinding a merchant application on the user computing device;

building an electronic shopping cart utilizing the merchant application on the user computing device with said electronic shopping cart including a plurality of products retrieved from the store by a user;

coupling the user computing device with the POS device utilizing a coupling code generated by the POS device;

transmitting the electronic shopping cart from the user computing device to the POS device in the store using the coupling code generated by the POS device, wherein transmitting the electronic shopping cart from the user computing device to the POS device in the store using the coupling code generated by the POS device comprises:

receiving, at a global server system, the plurality of products of the electronic shopping cart and the coupling code from the user computing device;

interpreting, by the global server system, the coupling code to identify the POS device that generated the coupling code; and transmitting the plurality of products of the electronic shopping cart to the POS device;

determining a list of product suggestions from one or more of (1) an expiry period of products in a purchase history of the user, or (2) a consumption period of the products in the purchase history of the user;

utilizing the merchant application to display the list of product suggestions on the user interface of the user computing device;

selecting a selected item from the list of product suggestions utilizing the merchant application on the user computing device, wherein the selected item corresponds to a product which is unretrieved from the store by the user;

displaying an optical code corresponding to the selected item on the user interface of the user computing device;

scanning the optical code displayed on the user computing device utilizing the scanner of the POS device in the store to add the selected item to the electronic shopping cart with an indicator that the selected item corresponds to the product which is unretrieved from the store by the user;

flagging, by the POS device, the selected item added to the electronic shopping cart; and transmitting, from the POS device to the computing device of the store representative, (1) an alert indicating that the transaction includes the selected item as flagged, (2) a location of the selected item, (3) an identifier of the POS device issuing the alert, and (4) a location of the POS device issuing the alert.

2. The method of claim 1, wherein the coupling code comprises an address from which the plurality of products of the electronic shopping cart is transmitted to the POS device.

3. The method of claim 1 wherein:
determining the list of product suggestions from the one or more of (1) the expiry period of the products in the purchase history of the user, or (2) the consumption period of the products in the purchase history of the user comprises:
   determining the list of product suggestions from both (1) the expiry period of the products in the purchase history of the user, and (2) the consumption period of the products in the purchase history of the user.

4. The method of claim 1, wherein:
the coupling code comprises an address from which the plurality of products of the electronic shopping cart are transmitted to the POS device; and
determining the list of product suggestions from the one or more of (1) the expiry period of the products in the purchase history of the user, or (2) the consumption period of the products in the purchase history of the user comprises:
   determining the list of product suggestions from both (1) the expiry period of the products in the purchase history of the user, and (2) the consumption period of the products in the purchase history of the user.

5. A method, comprising:
generating, with a point-of-sale (POS) device in a store, wherein the POS device comprises a scanner, a coupling code;
coupling a user computing device in data communication with the POS device in the store utilizing the coupling code generated by the POS device, wherein the user computing device comprises a merchant application having a user interface, a memory for storing one or more application programs including computer-readable instructions, and a processor for executing the computer-readable instructions;
receiving, at the POS device in the store, an electronic shopping cart from the merchant application on the user computing device using the coupling code generated by the POS device, the electronic shopping cart comprising one or more products retrieved from the store by a user, wherein the one or more products of the electronic shopping cart are received from a global server system that previously (1) received the one or more products of the electronic shopping cart and the coupling code from the merchant application on the user computing device and (2) interpreted the coupling code to identify the POS device that generated the coupling code;
scanning, with the POS device of the store, an optical code displayed on the user computing device to add a selected item, the selected item having been previously selected from a list of product suggestions displayed on the user interface of the merchant application on the user computing device, to the electronic shopping cart with an indicator that the selected item corresponds to a product from the list of product suggestions which is unretrieved from the store by the user wherein the list of product suggestions is determined from one or more of: (1) an expiry period of products in a purchase history of the user or (2) a consumption period of the products in the purchase history of the user;
flagging, by the POS device, the selected item added to the electronic shopping cart; and
transmitting, from the POS device to a store computing device of a store representative, (1) an alert indicating that a transaction corresponding to the electronic shopping cart includes the selected item as flagged, (2) a location of the selected item, (3) an identifier of the POS device issuing the alert, and (4) a location of the POS device issuing the alert.

6. The method of claim 5, wherein the coupling code comprises an address from which the one or more products of the electronic shopping cart are transmitted to the POS device.

7. The method of claim 5, wherein:
the coupling code comprises an address from which the one or more products of the electronic shopping cart are transmitted to the POS device; and
the list of product suggestions is determined from both (1) the expiry period of the products in the purchase history of the user associated with the user computing device, and (2) the consumption period of the products in the purchase history of the user.

8. A system comprising:
one or more processors; and
one or more non-transitory computer readable media storing computing instructions configured to run on the one or more processors and perform acts of:
   generating, with a point-of-sale (POS) device in a store, wherein the POS device comprises a scanner, a coupling code;
   coupling a user computing device in data communications with the POS device in the store utilizing the coupling code generated by the POS device, wherein the user computing device comprises a merchant application having a user interface, a memory for storing one or more application programs including computer-readable instructions, and a processor for executing the computer-readable instructions;
   receiving, at the POS device in the store, an electronic shopping cart from the merchant application on the user computing device using the coupling code generated by the POS device, the electronic shopping cart comprising one or more products retrieved from the store by a user, wherein the one or more products of the electronic shopping cart are received from a global server system that previously (1) received the one or more products of the electronic shopping cart and the coupling code from the merchant application on the user computing device and (2) interpreted the coupling code to identify the POS device that generated the coupling code;
   scanning, with the POS device of the store, an optical code displayed on the user computing device to add a selected item, the selected item having been previously selected from a list of product suggestions displayed on the user interface of the merchant application on the user computing device, to the electronic shopping cart with an indicator that the selected item corresponds to a product from the list of product suggestions which is unretrieved from the store by the user wherein the list of product suggestions is determined from one or more of: (1) an expiry period of products in a purchase history of the user or (2) a consumption period of the products in the purchase history of the user;
   flagging, by the POS device, the selected item added to the electronic shopping cart; and
   transmitting, from the POS device to a store computing device of a store representative, (1) an alert indicating that a transaction corresponding to the electronic shopping cart includes the selected item as flagged, (2) a location of the selected item, (3) an identifier of the POS device issuing the alert, and (4) a location of the POS device issuing the alert.

9. The system of claim 8, wherein the coupling code comprises an address from which the one or more products of the electronic shopping cart are transmitted to the POS device.

10. The system of claim 8, wherein:
the coupling code comprises an address from which the one or more products of the electronic shopping cart are transmitted to the POS device; and
the list of product suggestions is determined from both (1) the expiry period of the products in the purchase history of the user associated with the user computing device, and (2) the consumption period of the products in the purchase history of the user.

11. A system comprising:
one or more processors; and
one or more non-transitory computer readable media storing computing instructions configured to run on the one or more processors and perform acts of:
providing a merchant application on a user computing device;
building an electronic shopping cart utilizing the merchant application on the user computing device with said electronic shopping cart including a plurality of products retrieved from a store by a user;
coupling the user computing device with a point-of-sale (POS) device utilizing a coupling code generated by the POS device;
transmitting the electronic shopping cart from the user computing device to the POS device in the store using the coupling code generated by the POS device, wherein transmitting the electronic shopping cart from the user computing device to the POS device in the store using the coupling code generated by the POS device comprises:
receiving, at a global server system, the plurality of products of the electronic shopping cart and the coupling code from the user computing device;
interpreting, by the global server system, the coupling code to identify the POS device that generated the coupling code; and
transmitting the plurality of products of the electronic shopping cart to the POS device;
determining a list of product suggestions from one or more of (1) an expiry period of products in a purchase history of the user, or (2) a consumption period of the products in the purchase history of the user;
utilizing the merchant application to display the list of product suggestions on a user interface of the user computing device;
selecting a selected item from the list of product suggestions utilizing the merchant application on the user computing device, wherein the selected item corresponds to a product which is unretrieved from the store by the user;
displaying an optical code corresponding to the selected item on the user interface of the user computing device;
scanning the optical code displayed on the user computing device utilizing a scanner of the POS device in the store to add the selected item to the electronic shopping cart with an indicator that the selected item corresponds to the product which is unretrieved from the store by the user;
flagging, by the POS device, the selected item added to the electronic shopping cart; and
transmitting, from the POS device to a computing device of a store representative, (1) an alert indicating that a transaction includes the selected item as flagged, (2) a location of the selected item, (3) an identifier of the POS device issuing the alert, and (4) a location of the POS device issuing the alert.

12. The system of claim 11, wherein the coupling code comprises an address from which the plurality of products of the electronic shopping cart is transmitted to the POS device.

13. The system of claim 11, wherein:
determining the list of product suggestions from the one or more of (1) the expiry period of the products in the purchase history of the user, or (2) the consumption period of the products in the purchase history of the user comprises:
determining the list of product suggestions from both (1) the expiry period of the products in the purchase history of the user, and (2) the consumption period of the products in the purchase history of the user.

14. The system of claim 11, wherein:
the coupling code comprises an address from which the plurality of products of the electronic shopping cart is transmitted to the POS device; and
determining the list of product suggestions from the one or more of (1) the expiry period of the products in the purchase history of the user, or (2) the consumption period of the products in the purchase history of the user comprises:
determining the list of product suggestions from both (1) the expiry period of the products in the purchase history of the user, and (2) the consumption period of the products in the purchase history of the user.

\* \* \* \* \*